United States Patent
Eisenhut et al.

(10) Patent No.: US 7,410,667 B2
(45) Date of Patent: Aug. 12, 2008

(54) METHOD OF APPLYING A RADIATION CURED RESIN WITH A TRANSPARENT, REMOVABLE OVERLAY

(75) Inventors: Anthony R. Eisenhut, Lansing, NY (US); Eric D. Eisenhut, Easton, PA (US)

(73) Assignee: MedHesives, Inc., Ithaca, NY (US)

( * ) Notice: Subject to any disclaimer, the term of this patent is extended or adjusted under 35 U.S.C. 154(b) by 18 days.

(21) Appl. No.: 11/294,330

(22) Filed: Dec. 6, 2005

(65) Prior Publication Data

US 2006/0118230 A1 Jun. 8, 2006

Related U.S. Application Data

(60) Provisional application No. 60/632,943, filed on Dec. 6, 2004.

(51) Int. Cl.
*B05D 3/06* (2006.01)

(52) U.S. Cl. .................................. 427/140; 427/508
(58) Field of Classification Search .................. None
See application file for complete search history.

(56) References Cited

U.S. PATENT DOCUMENTS

| 2,905,206 | A | * | 9/1959 | Creighton, Jr. | 138/99 |
| 3,043,342 | A | * | 7/1962 | Graham | 138/99 |
| 4,357,961 | A | * | 11/1982 | Chick | 138/97 |
| 4,552,183 | A | * | 11/1985 | Chick | 138/99 |
| 4,909,736 | A | * | 3/1990 | Ritter | 433/39 |

* cited by examiner

*Primary Examiner*—William P Fletcher, III
(74) *Attorney, Agent, or Firm*—Welsh & Flaxman LLC

(57) ABSTRACT

A process of using a transparent overlay device with a resin for repairing a small hole in a pipe includes applying an adhesive resin to a transparent overlay; applying the adhesive resin to a pipe surface over a hole and curing the adhesive resin through the application of a light source.

19 Claims, 1 Drawing Sheet

FIG. 1
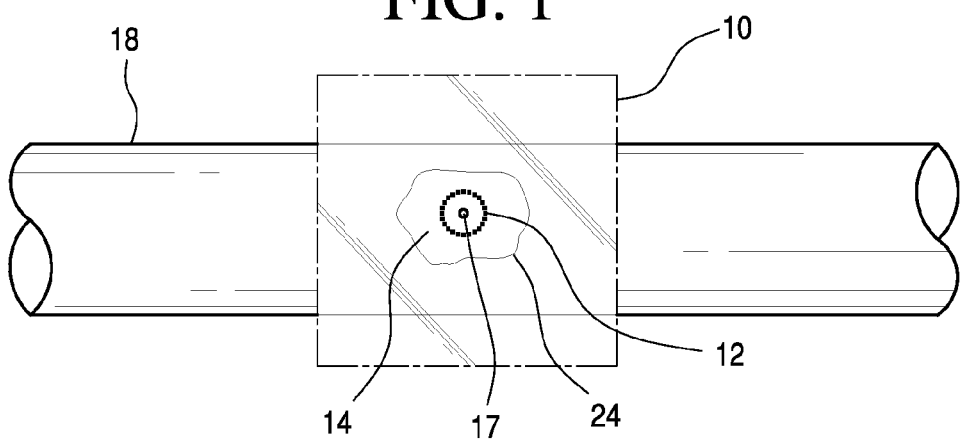
FIG. 2
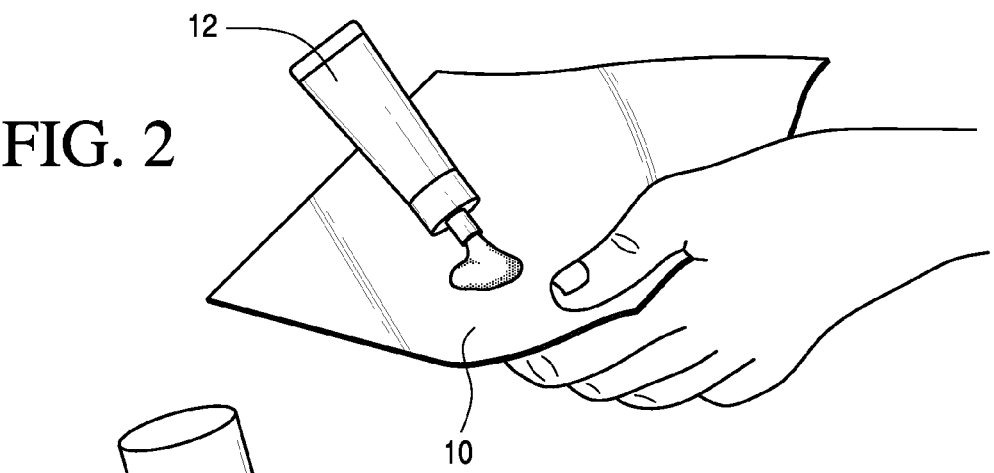
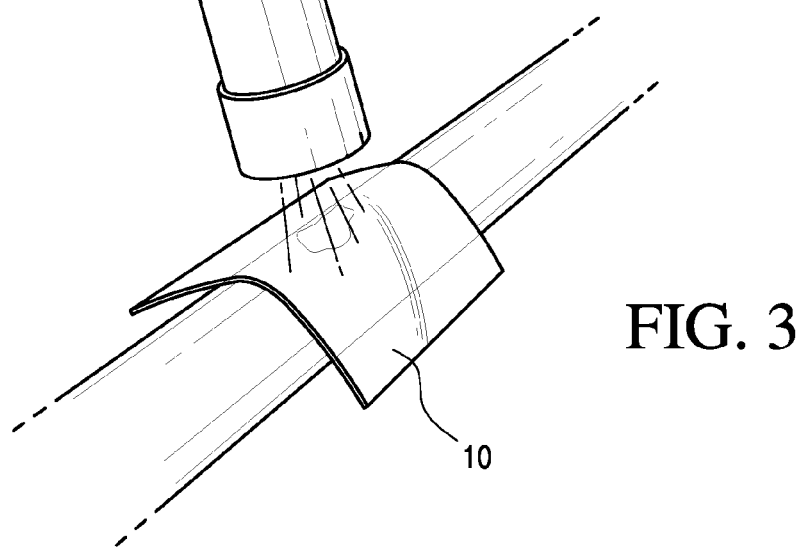
FIG. 3

METHOD OF APPLYING A RADIATION CURED RESIN WITH A TRANSPARENT, REMOVABLE OVERLAY

CROSS REFERENCE TO RELATED APPLICATIONS

This application is based upon U.S. Provisional Patent Application Ser. No. 60/632,943, filed Dec. 6, 2004, entitled "METHOD OF APPLYING A RADIATION CURED RESIN WITH A TRANSPARENT REMOVABLE OVERLAY".

BACKGROUND OF THE INVENTION

1. Field of the Invention

The invention relates to a method of utilizing a transparent overlay device and visible light to apply and form radiation cured adhesive resins while they ate being cured. The methods include application of radiation cured adhesive resins to various types and shaped surfaces, such as dry surfaces, wet surfaces, underwater surfaces, curved surfaces and surfaces affected by extreme temperatures.

2. Description of the Prior Art

When adhesive resins are applied to a surface, they often are mechanically pushed onto the intended surface with tools such as putty knives, fingers or the tip of a tube of resin. This may be effective for areas with high surface energies or where gravity and external forces maintain the pressure of the adhesive onto the intended surface. However, when working on wet surfaces or on surfaces with low surface energies, there is a significant functional improvement to adhesive strength if an overlay material is used to ensure the adhesive is held onto the intended surface until it is functionally cured.

A need exists for a versatile method of promoting rapid curing of adhesive resins to surfaces while applying pressure to maintain the adhesive resins in place during the curing process and keeps oxygen from reaching the adhesive resins during free radical polymerization curing. The present invention provides such a method.

SUMMARY OF THE INVENTION

It is, therefore, an object of the present invention to provide a method for applying adhesive resins to surfaces.

It is another object of the present invention to provide for application of adhesive resins to dry surfaces, wet surfaces, underwater surfaces, and surfaces affected by extreme temperatures.

It is also an object of the present invention to provide for rapid curing through the use of energy (radiation) cured adhesive resins.

It is a further object of the present invention to provide an overlay device to be placed over the adhesive resins to promote rapid curing.

It is also another object of the present invention to provide an overlay device made of a material that allows the desired curing mechanism to approach and activate the curing of the adhesive resins.

It is yet another object of the present invention to provide a transparent overlay device made of a material that allows visible light to reach the adhesive resins when that adhesive resins are energy (radiation) cured adhesive resins.

It is still another object of the present invention to provide a formable overlay device that can be tailored to the size of an intended repair/assembly using adhesive resins.

It is yet a further object of the present invention to provide a reusable overlay device made of a material releasable from adhesive resins, permitting the overlay to be removed for reuse once the resin is functionally cured.

It is a further object of the present invention to provide an overlay device which can be used to disperse and hold the adhesive resins in place prior to and during the curing process.

It is also a further object of the present invention to provide a reusable overlay device comprised of materials such as PCTFE or commercial products ACLAR and CLARIS produced by Honeywell.

It is still a further object of the present invention to provide a thin overlay device with a thickness allowing the device to be formed around corners or other objects.

Another object of the present invention is to provide an overlay device with a thickness allowing the device to maintain its shape in the presence of an adhesive resin.

It is also another object of the present invention to provide an overlay device which keeps oxygen off of the adhesive resins during free radical polymerization.

It is still another object of the present invention to provide for mounting of adhesive resins to various materials, such as metals, wood, composites, plastics, rocks, and animals.

It is a further object of the present invention provide for repair of pipes, tanks, and equipment under dry and wet conditions using visible light cured adhesive resins.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a picture depicting the process of application of an overlay device to an adhesive resin applied to a pipe.

FIG. 2 is a picture showing application of an adhesive resin to a surface.

FIG. 3 is a picture showing curing of an adhesive resin via visible light shining through an overlay device.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to the attached drawings, a method for applying adhesive resins, such as adhesive resins, to surfaces is disclosed. The method is accomplished through application of an overlay device used to promote curing of the adhesive resins.

FIG. 1 shows one embodiment of the present invention. The embodiment illustrates the process of using a transparent overlay device 10 with a resin 12 applied to a cleaned pipe surface 14 for repairing a small hole in a pipe 18. The process begins with the application of adhesive resin 12 to the transparent overlay 10 and then to the pipe surface 14. The adhesive resin 12 is preferably in the form of a single component material that requires no mixing and is curable by radiation falling within the visible light frequency ranges. The transparent overlay 10, as shown by the combination of dotted and dashed lines, is in the form of a square. A mound of adhesive resin 12 is applied thereto and is shown by the dotted lines forming a circle. The solid line labeled 24 shows the area covered by the adhesive resin after the overlay 10 is applied to the pipe surface 14 over a hole 17. The adhesive resin 12 spreads out and into the hole 17 as the overlay 10 is pressed onto the pipe surface 14. The spreading of the adhesive resin 12 forces any water leaking from the hole 17 away from the hole 17. The pressing forces adhesive resin 12 into the hole 17. The application of light with a LED light source 16, as shown in FIG. 3, causes the resin to cure rapidly, that is between 30-60 seconds. Once cured, the adhesive resin 12 bonds with the pipe surface 14 and forms a plug which fills the small hole 17. Holes of 0.05 inches in diameter have been repair. Bond strengths of greater than 800 psi have also been obtained.

FIG. 2 illustrates the adhesive resin 12 being applied as a mound to the overlay 10 as the overlay 10 is being held. The area of the mound should be minimized to prevent spreading of the adhesive resin 12 beyond the perimeter of the transparent overlay 10. To further prevent excessive spreading of the adhesive resin 12, the transparent overlay 10 is tailored so that it covers an area at least twice as large as the area to which adhesive resin 12 is to be applied. The transparent overlay 10 with the adhesive resin 12 thereon is placed over and compressed to conform to the surface one intends the adhesive resin to bond with. With the transparent overlay 10 held in place, an external light source 16 is put in close proximity to the adhesive resin 12, see FIG. 3. Radiation emitted by external light source 16 passes through the transparent overlay 10, promoting curing of adhesive resin 12. When the adhesive resin 12 is functionally cured, the transparent overlay 10 can be removed as it is comprised of a material releasable from adhesive resins. The transparent overlay 10 is thereafter available for reuse.

The transparent overlay device 10 is composed of clear materials, such as PCTFE (ACLAR (Honeywell) or CLARIS (Honeywell)), that permit passage of the radiation from the point of emission to the adhesive resin. These same materials do not adhere to the adhesive resins used permitting removal of the transparent overlay device upon curing. However, other materials may be used without departing from the spirit of the invention.

In wet applications, the transparent overlay 10 is applied onto the surface such that the adhesive resin 12 flows uniformly across the wet surface, displacing any water. As an example, a transparent overlay 10 permitted holes in a pipe to be repaired underwater. Using the method described above, adhesive resin 12 is applied to an overlay and then over surface 14 filling the holes. The viscosity of the adhesive resin 12 is such that the adhesive resin 12 fills the desired area of the intended bond interface, replacing any water present. The viscosity of the adhesive resin 12, therefore, must be greater than the viscosity of water while still being thin enough to achieve a workable flow rate to fill the desired area of the intended bond interface. At the same time, the adhesive resin 12 must be sufficiently thick to prevent it from flowing out of the intended bond area. Under these conditions, the adhesive resin 12 cured in 30 seconds and the transparent overlay device 10 was removed. The uniformity of the adhesive resin 12 curing in the hole and on the surrounding surfaces allows for added strength.

Generally, an effective radiation intensity for curing is at least 2.5 mw/cm$^2$ along the bond line. A preferred adhesive resin is sensitive to light at 470 nm wavelengths and requires blue light for curing to be most efficient. However, those skilled in the art will appreciate that various curing intensities and wavelengths may be employed without departing from the spirit of the present invention.

The adhesive resins that lend themselves well to use with transparent overlays include radiation cured materials that are based on free-radical polymerization or cationic polymerization. Such polymerizable, acrylate resins comprise a class of thermoplastic or thermoset polymers or copolymers. These oligomers polymerize readily in the presence of light, heat or catalysts. In general, acrylate resins must be stored or shipped with inhibitors present in the composition to avoid spontaneous and explosive polymerization. Acrylate resins vary in physical properties from very hard brittle solids to fibrous elastomeric structures to viscous liquids, depending upon the monomer used and the method of polymerization employed. The polymer may include many different kinds of unsaturated monomer, and is selected from the group consisting of: methyl methacrylate, butyl acrylate, hydroxyethylacrylate, methyl acrylate, ethyl acrylate, isopropyl acrylate, n-butyl acrylate, s-butyl acrylate, t-butyl acrylate, 2-ethylhexyl acrylate, cyclohexyl acrylate, 3,3,5-trimethycyclohexyl acrylate, 2-methoxyethyl acrylate, 2-ethoxyethyl acrylate, 2-butoxyethyl acrylate, acrylonitrile, methyl methacrylate, ethyl methacrylate, isopropyl methacrylate, n-butyl methacrylate, s-butyl methacrylate, t-butyl methacrylate, n-hexyl methacrylate, n-octyl methacrylate, lauryl methacrylate, tridecyl methacrylate, stearyl methacrylate, phenyl methacrylate, cyclohexyl methacrylate, 3,3,5-trimethylcyclohexyl methacrylate, isobornyl methacrylate, bromoethyl methacrylate, 2-hydroxyethyl methacrylate, hydroxypropyl methacrylate, glycidyl methacrylate, methoxyethyl methacrylate, ethoxyethyl methacrylate, diethyl methyleneglutarate, isocyanatoethyl methacrylate, methacrylic acid, methacrylonitrile, 2-(diethylphosphato)ethyl methacrylate, 1-diethylphosphonoethyl methacrylate, ethylene, butadiene, vinylidene chloride, and n-vinylpyrrolidinone.

In general, the radiation curing process requires a UV or visible lamp that directs desired light onto the formulated product. Photoinitiators absorb the desired energy from the light source, causing a chemical reaction that quickly converts the liquid or paste into a solid, cured form. The initiators for photo polymerization are generally known from the literature, e.g. U.S. Pat. Nos. 5,354,827 and 4,437,836, which are incorporated herein by reference. Preferably, they are mono- or dicarbonyl compounds such as benzophenone; benzoin and its derivatives, in particular benzoin methyl ether; benzil and benzil derivatives; other dicarbonyl compounds, such as diacetyl, 2,3-pentanedione and .alpha.-diketo derivatives of norbornane and substituted norbornanes; metal carbonyls, such as pentacarbonyl manganese; or quinones, such as 9,10-phenanthrenequinone and naphthoquinone. One preferred photoinitiator is camphorquinone.

Viscosity of the adhesive resin can be tailored by including a filler material. In general, filler materials for adhesive resins typically are silica, glass beads, polymers, gypsum, talcum, or carbon black. Especially preferred is a polymer filler material that does not settle over time, but remains suspended in the adhesive resin in a uniform fashion. A range of viscosity found to work with our invention is between approximately 84,000 cP to 168,000 cP.

The specific gravity of the adhesive resin must be greater than water if being used underwater or to repair leaks in water pipes. In accordance with a preferred embodiment, the adhesive resin employed has a specific gravity of 1.15. Specific gravity is a ratio of the mass of a material to the mass of an equal volume of water at 4° C. (39° F.). Generally, the specific gravity of water is 1.

The transparent overlay devices used within the spirit of the present invention can take various shapes and sizes. Preferably the transparent overlay 10 is tailored to the size of an intended repair/assembly. The transparent overlay 10 is thin enough to permit it to be formed around corners, other physical conditions or objects. At the same time, the overlay 10 is sufficiently thick allowing it to maintain its shape in the presence of the adhesive resin. The transparent overlay 10, when conformed to the shape of the repair/assembly, keeps oxygen off the adhesive resin 12 during curing. The result of the oxygen deprivation in free- radical polymerization is that the surface will cure dry, without any greasy texture that is prevalent when such polymerization is done in the presence of oxygen.

The external light source 16 used to effectuate curing of the adhesive resin materials needs to provide the specified wavelength that cures the selected material. In accordance with a preferred embodiment, an adhseive resin sensitive to 470 nm wavelengths and requiring blue light for curing has been found to be most efficient. The external light source 16 can be shrouded such that all energy is confined to the repair/assembly and no energy can be externally detected. The external light source 16 can be a flash light rated for underwater use and powered via batteries.

Alternatively, the transparent overlay 10 may include an LED array as the external light source 16. The LED array can be embedded within, or otherwise associated with the, transparent overlay 10 for emission of the desired wavelength of radiation. Similarly, batteries powering the LED array can be embedded within, or otherwise associated with, the transparent overlay 10. The LED array is positioned in a defined array such that maximum intensity is provided across the entire bond line. Activation of the lighting can occur by any mechanical or electrical action capable of activating the external light source 16, such as, by push button, switch, rotational force to align battery contacts, etc.

Light activated adhesive resins provide the added benefit of desired bond strengths at extreme temperatures. These temperature extremes are those seen in fresh and salt water prior to becoming ice. The bond strength remains effective from approximately 28° F. to 104° F. Further, since the adhesive resin is light activated, the present invention does not suffer from extended cure times that are typical of epoxy products when used below approximately 40° F. Therefore, the present invention may be used in extreme temperatures and water environments where others fail.

While the preferred embodiment has been shown and described, it will be understood that there is no intent to limit the invention by such disclosure, but rather, is intended to cover all modifications and alternate constructions falling within the spirit and scope of the invention.

The invention claimed is:

1. A process of using a transparent overlay device with an adhesive resin for repairing a hole in a pipe, comprising:
   applying an adhesive resin to a transparent overlay;
   applying the adhesive resin and overlay to a pipe surface over a hole;
   curing the adhesive resin through the application of light from a light source; and
   removing the overlay once the resin is cured.

2. The process according to claim 1, wherein the adhesive resin is in the form of a single component material that requires no mixing.

3. The process according to claim 2, wherein the adhesive resin is curable by radiation falling within the visible light frequency ranges.

4. The process according to claim 1, wherein the light source is an LED light source.

5. The process according to claim 1, wherein the transparent overlay is shaped and dimensioned so that it covers an area at least twice as large as the area to which the adhesive resin is to be applied.

6. The process according to claim 1, wherein the transparent overlay is composed of PCTFE.

7. The process according to claim 1, wherein an effective radiation intensity for curing is at least 2.5 mw/cm$^2$.

8. The process according to claim 1, wherein the adhesive resin is sensitive to light at 470 nm wavelengths.

9. The process according to claim 1, wherein the adhesive resin is a radiation cured material based on free-radical polymerization or cationic polymerization.

10. The process according to claim 9, wherein the adhesive resin includes materials selected from the group consisting of: methyl methacrylate, butyl acrylate, hydroxyethylacrylate, methyl acrylate, ethyl acrylate, isopropyl acrylate, n-butyl acrylate, s-butyl acrylate, t-butyl acrylate, 2-ethylhexyl acrylate, cyclohexyl acrylate, 3,3,5-trimethycyclohexyl acrylate, 2-methoxyethyl acrylate, 2-ethylhexyl acrylate, 2-butoxyethyl acrylate, acrylonitrile, methyl methacrylate, ethyl methacrylate, isopropyl methacrylate, n-butyl methacrylate, s-butyl methacrylate, t-butyl methacrylate, n-hexyl methacrylate, n-octyl methacrylate, lauryl methacrylate, tridecyl methacrylate, stearyl methacrylate, phenyl methacrylate, cyclohexyl methacrylate, 3,3,5-trimethylcyclohexyl methacrylate, isobornyl methacrylate, bromoethyl methacrylate, 2-hydroxyethyl methacrylate, hydroxypropyl methacrylate, glycidyl methacrylate, methoxyethyl methacrylate, ethoxyethyl methacrylate, diethyl methyleneglutarate, isocyanatoethyl methacrylate, methacrylic acid, methacrylonitrile, 2-(diethylphosphato)ethyl methacrylate, 1-diethylphosphonoethyl methacrylate, ethylene, butadiene, vinylidene chloride, and n-vinylpyrrolidinone.

11. The process according to claim 1, wherein the adhesive resin has a viscosity between approximately 84,000 cP to 168,000 cP.

12. The process according to claim 1, wherein the adhesive resin has a specific gravity greater than water.

13. A process of using a transparent overlay device with an adhesive resin for repairing a hole in a pipe, comprising:
   applying a single component adhesive resin to a transparent overlay;
   applying the adhesive resin and overlay to a pipe surface over a hole;
   curing the adhesive resin through the application of light from a light source within the visible light frequency range; and
   removing the overlay once the resin is cured.

14. The process according to claim 13, wherein the light source is an LED light source.

15. The process according to claim 13, wherein the transparent overlay is shaped and dimensioned so that it covers an area at least twice as large as the area to which the adhesive resin is to be applied.

16. The process according to claim 13, wherein the transparent overlay is composed of PCTFE.

17. The process according to claim 13, wherein an effective radiation intensity for curing is at least 2.5 mw/cm$^2$.

18. The process according to claim 13, wherein the adhesive resin is sensitive to light at 470 nm wavelengths.

19. The process according to claim 13, wherein the adhesive resin is a radiation cured material based on free-radical polymerization or cationic polymerization.

* * * * *